Figure 1:
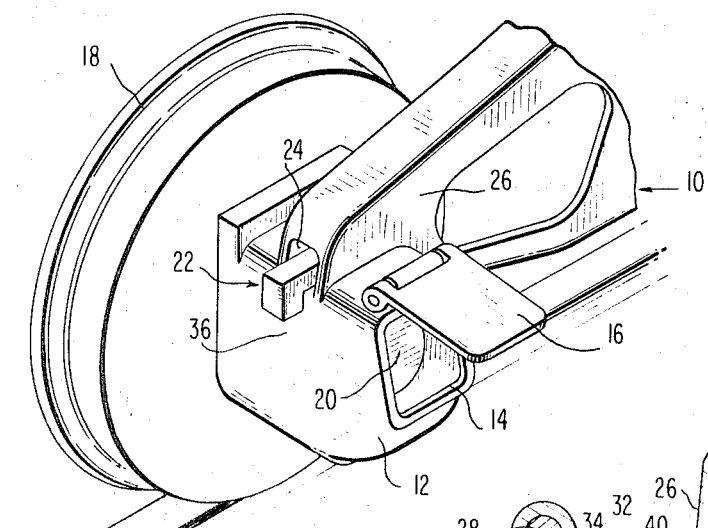

United States Patent
Pelino

[11] 3,790,777
[45] Feb. 5, 1974

[54] INDICATOR FOR OVERHEATED BEARINGS

[75] Inventor: William M. Pelino, Richmond, Va.

[73] Assignee: Railtron Corporation, Richmond, Pa.

[22] Filed: May 26, 1972

[21] Appl. No.: 257,292

[52] U.S. Cl. ............................ 246/169 A, 116/114.5
[51] Int. Cl. ................................................ B61k 9/00
[58] Field of Search ......... 246/169 R, 169 A, 169 S; 116/114.5

[56] References Cited
UNITED STATES PATENTS

| | | |
|---|---|---|
| 1,512,456 | 10/1924 | Carman ........................ 246/169 A |
| 2,503,593 | 4/1950 | Pearce et al. .................. 246/169 A |
| 2,350,637 | 6/1944 | Pittman ........................... 116/114.5 |
| 630,292 | 8/1899 | MacKenzie ..................... 116/114.5 |

Primary Examiner—Robert J. Spar
Assistant Examiner—George H. Libman
Attorney, Agent, or Firm—David H. Hill

[57] ABSTRACT

An indicator for overheated vehicle bearings including means for releasing a tethered weight at a predetermined bearing temperature, the depending weight providing an alarm indication visually and both audibly and electrically in combination with associated strike plates and electromechanical transducers.

22 Claims, 5 Drawing Figures

PATENTED FEB 5 1974 3,790,777

SHEET 1 OF 2

INDICATOR FOR OVERHEATED BEARINGS

This invention pertains generally to apparatus for indicating overheated bearings, and more particularly to apparatus for detecting and indicating overheated vehicle wheel bearings or "hotboxes."

The need for hotbox detection and indication is well known in the railroad industry, where undetected hotboxes have caused numerous derailments, with loss of life and property, as a result of failure of the bearing and eventual "burn-off" of the car axle.

The prior art attempts at solving the problem of overheated bearing or journal detection are numerous. Some of the earlier detecting means included devices carried on the railroad cars which provided indication of the bearing temperature, either qualitatively, in the form of an explosive charge or the like which is ignited once a threshold temperature in the bearing was exceeded, or quantitatively, where an actual temperature reading was displayed for observation by railroad personnel.

Subsequent to such early steps in the art, more sophisticated techniques were employed, in which radiant energy detectors, usually infrared bolometers, were utilized at wayside for observing the journal boxes of the wheel trucks of cars passing thereby and for providing an alarm or other suitable signal upon the occurrence of an overheated bearing. One example of a hotbox detector of this type is disclosed in my U.S. Pat. No. 3,440,416.

Of course, the ideal solution to the hotbox problem is to preclude their occurrence by eliminating the conditions giving rise to the unacceptable increase in friction and attendant temperature. That is to say, if every journal box or roller bearing were perfectly manufactured and assembled, and if every such assembly were properly lubricated at all times, the cause and the effect would be eliminated. However, practical limitations, such as neglect in routine maintenance resulting in a failure to replenish the lubricant supply, dictate the necessity of surveillance.

With the need for hotbox detection an accepted fact, then, the industry's needs are best met by a detector system which is at once reliable and inexpensive. Much of the prior art technology fails, in one or more ways, to meet this standard of operation.

For example, reliability of the prior art systems, even the relatively sophisticated infrared systems, is disappointing, with many false readings being obtained by virtue of an infrared detector having looked at a hot brake shoe or at the sky. While a hotbox detector system which reports false alarms along with all the actual hotboxes affords safety, the costs involved in stopping trains to prove untrue the false alarms are prohibitive.

Further, the cost of installation alone can prove prohibitive. By the very nature of their origin, hotboxes are unpredictable and random as to time of occurrence. Accordingly, wayside hotbox detectors must be installed at rather short distances, one to another, along the right-of-way, so that a hotbox cannot develop and cause damage between detector stations. Even if the expense of installing infrared hotbox detectors at fifty mile intervals, a considerable expense, were to be considered economically feasible, it has been found in practice that a derailing hotbox can occur between two detectors so positioned, especially where a latent hotbox was developing heat to produce a temperature just under the threshold level of a given detector, so that it passed such given detector with no alarm and then progressed to a derailing condition prior to arrival at the next detector, fifty miles distant. One solution to this problem is to install the detectors at more frequent intervals along the right-of-way, that is, spaced closer together, but the installation costs then again become prohibitive.

A much better solution to the problem of hotbox detection then heretofore offered, satisfying both the requirements of reliability and continuous monitoring is provided in accordance with the present invention by means of an apparatus having a suitable weight (a metallic ball, cylinder or the like) tethered to a relatively stationary or fixed member of the vehicle by way of an elongate flexible support means which is stored in compacted form, positioning such weight adjacent such fixed member, within a temperature-sensitive medium which is responsive to an abnormal temperature of the associated wheel bearing to, at a preselected or determined temperature, release the weight and flexible support which fall, by gravity, to provide a visual indication of an overheated bearing and, in combination with inexpensive wayside means installed at short intervals, to provide both an impact indication and an electrical signal indicative of the presence of such overheated bearing and of the exact location thereof as well.

Figure 2:
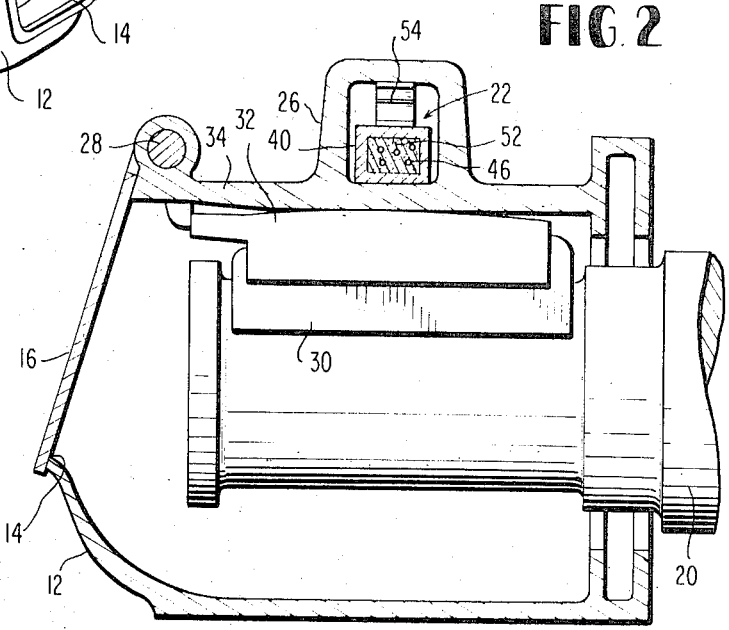
Figure 3:
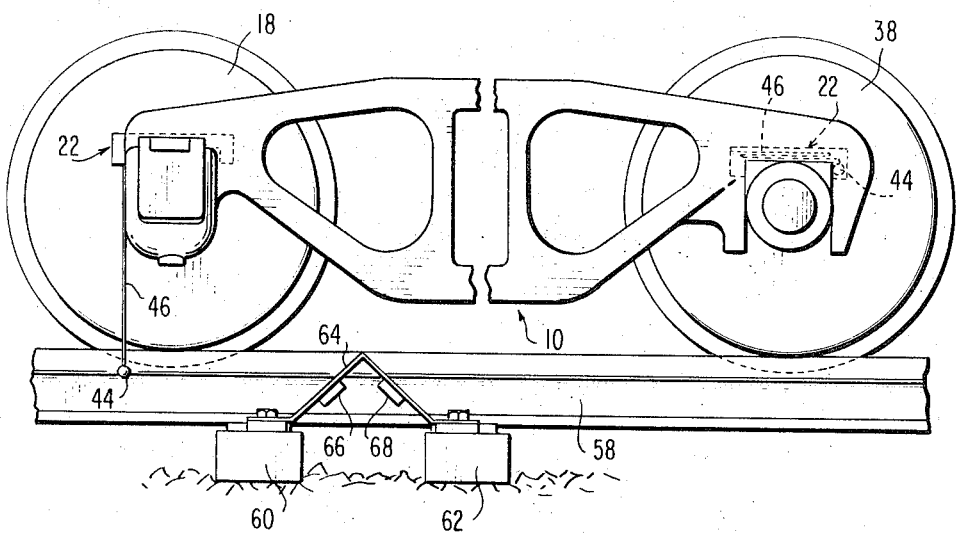
Figure 4:
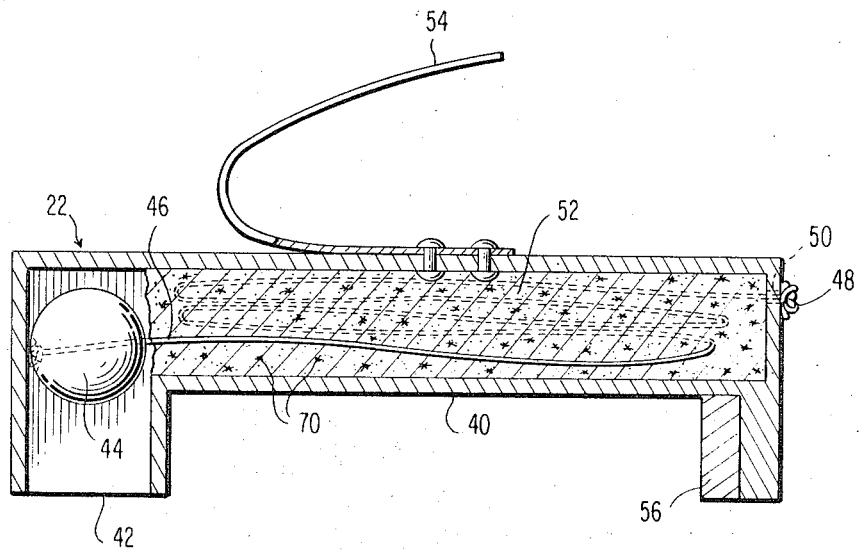
Figure 5:
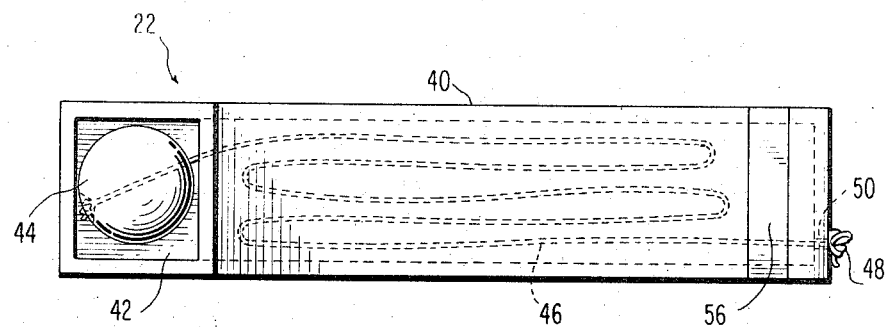

With the above considerations and objects in mind, the invention itself will now be described in connection with a preferred embodiment thereof, given by way of example and not of limitation, and with reference to the accompanying drawings in which:

FIG. 1 is a perspective view of a portion of a railway wheel truck assembly, partially showing the apparatus of the present invention, FIG. 2 is a vertical section view of a typical journal bearing to which the temperature-sensitive apparatus of the present invention has been applied, FIG. 3 is an elevation view of a railway wheel truck with the apparatus of the present invention indicating an overheated bearing, FIG. 4 is a vertical section view of the temperature-sensitive apparatus of the present invention, and FIG. 5 is a bottom view of the apparatus of FIG. 4.

Referring now to FIG. 1 in particular, there is shown therein a portion of a railway wheel truck assembly in perspective, indicated generally at 10. This wheel truck assembly includes a journal bearing (not shown) within the journal box 12 having the usual access opening 14 and hinged cover plate 16, the latter being shown in its open position. The associated railway car wheel 18 is mounted on axle 20, the near end of which is seen within journal box 12 through access opening 14.

The temperature-sensitive indicating apparatus of the present invention is shown at 22 in position within the opening 24 in the hollow side frame 26 of the wheel truck assembly 10.

FIG. 2 shows in vertical section a typical construction of a rail-way journal bearing, including journal box 12, access aperture 14 and cover or lid 16 supported at its top edge on the journal box 12 by means of hinge assembly 28. Axle 20 extends within journal box 12, as shown, and the rotary bearing member 30, usually of brass, contacts the upper surface of the axle as the bearing 30 supports the weight of the railway car through journal box 12 and wedge 32. As is common, the journal box 12 is provided with a stuffing of absorbent material (not shown) into which the lubricant is introduced, the stuffing wiping on the surface of axle 20 contacted by bearing 30, whereby as the axle 20 rotates relative to the journal box 12, the lubricant is applied from the stuffing to the axle surface and is then transmitted to the interface between the axle 20 and the bearing material 30.

It has been discovered in practice that the frictional heat developed at this interface between axle 20 and bearing 30 is, for the most part, transmitted upwardly through the bearing brass 30 and the wedge 32 into the top of the journal box 12, this top plate being indicated at 34 in FIG. 2. Journal box top 34 thus becomes the initial point of heat distribution from the bearing-axle interface to the members external of the journal box. Accordingly, the external members most closely associated with the journal box top 34, as well as top 34 itself, constitute the most reliable members for indicating the temperature of the bearing. More particularly, the heat generated in bearing 30 is most reliably monitored by an observance of the temperature of the journal box top 34, the adjacent end of the hollow side frame 26 and the adjacent uppermost portions of the side walls of the journal box 12, one of these side walls being indicated at 36 in FIG. 1.

Accordingly, the temperature-sensitive indicating apparatus 22 of the present invention is most advantageously positioned within the opening 24 in the hollow side frame 26, whereby the apparatus 22 rests on the journal box top 34 at the source of the major portion of the heat transmitted from the bearing 30 to the exterior of the journal box 12.

FIG. 3 shows a typical railway wheel truck assembly 10 with two wheels 18 and 38, and for purposes of illustration, the bearing associated with wheel 18 is shown as a friction or journal bearing corresponding to the structure of FIGS. 1 and 2, whereas the bearing associated with wheel 38 is shown as a roller bearing.

In either case, whether in association with a journal bearing or a roller bearing, the temperature-sensitive indicating apparatus 22 of the present invention is positioned just above the bearing, as shown.

The temperature-sensitive indicating apparatus 22 of the present invention is shown in greater detail in FIGS. 4 and 5, where it may be seen to constitute an elongate housing 40 having at one end an opening 42 through which metallic weight 44 or the like may freely pass. Weight 44 is secured to an elongate flexible tethering or support means 46 which is stored within housing 40 in compacted form, the remote end 48 of flexible support means 46 being secured to housing 40 in any suitable manner, such as by extending through a small aperture 50 and being anchored or otherwise secured exteriorly thereof. A suitable temperature-sensitive substance 52, such as a thermal casting resin or low melting eutectic mixture acting as a potting compound, substantially fills the interior of the housing 40, encompassing the folded or compacted flexible tether means 46 and retaining the same in this position so as to, correspondingly, retain weight 44 in the position shown. A leaf spring 54 is mounted on the upper surface of housing 40, serving to cooperate with the inner surface of the upper side of the hollow side frame 26 to retain the temperature-sensitive indicating apparatus 22 within the hollow side frame 26 in the position shown in FIGS. 1, 2 and 3. A shim 56 or the like may also be utilized to assist in retaining the apparatus 22 within the opening in the hollow side frame, and it will be understood that the thickness of the shim 56 may be varied to accommodate the housing 40 to different sizes of side frames of the wheel truck assemblies of various rolling stock.

Referring again to FIG. 3, the two temperature-sensitive members of the apparatus of the present invention (both bearing the reference numeral 22) shown in this figure are illustrated in two different conditions, the indicator apparatus 22 associated with the roller bearing adjacent wheel 38 being in its normal or ready condition with the weight 44 therein and the elongate flexible support means 46 also stored therein in compacted form. As will be further described, upon the occurrence of an overheated bearing, the indicator apparatus 22 of the present invention is adapted to release the weight 44 to an extended tethered position at the end of the extended support means 46, as is illustrated by the weight 44 and the flexible support means 46 adjacent wheel 18 in FIG. 3.

In this alarm or overheated journal indicating position of the weight 44 and the flexible support means 46 associated with wheel 18 in FIG. 3, the weight 44 is supported substantially at rail side, adjacent rail 58 traversed by wheel 18. Also positioned adjacent rail 58, as by being mounted on a pair of adjacent ties 60 and 62, is a strike plate 64 or the like upon which are mounted electromechanical transducers 66 and 68, such strike plate and electromechanical transducers being more fully described in my U.S. Pat. No. 3,546,448. In such patent there are disclosed means for providing both impact and electrical indications of the impact of dragging equipment or the like upon the strike plate. More specifically, when a strike plate such as disclosed in my U.S. Pat. No. 3,546,448 is struck by an object depending from a passing railway car, the impact produces a noticeable audible signal, such as the "clang" of metal upon metal, and also produces an electrical output signal by virtue of the vibration of electromechanical transducers mounted on the strike plate. Obviously, the electrical output signal produced by the transducers may be applied to any desired indicating or alarm means.

In the operation of the apparatus of the present invention, the elongate flexible support means 46 is stored in compacted form within the housing 40, with weight 44 thus also being stored within the housing. The flexible support means 46, and, indeed, the weight 44 if desired, is preserved in this position by means of being immersed or potted in a suitable temperature-sensitive substance 52 which is normally in its solid state, remaining so for all temperatures up to a predetermined temperature corresponding to the maximum permissible temperature to which the apparatus 22 in position over a vehicle wheel bearing will be allowed to be subjected without giving an indication of an overheated bearing. This temperature-sensitive material 52 will, correspondingly, melt at temperatures above such predetermined temperature within housing 40 (corresponding to an overheated bearing temperature directly at the bearing), resulting in the release of the flexible support means 46, whereupon the weight 44 falls by gravity through the opening 42 to the position shown in FIG. 3 at the end of the elongate flexible support means 46 in its extended position. Obviously, the length of support means 46 is such that weight 44 hangs substantially at rail side, and the effective length of the elongate support member 46 is substantially the distance from its effective point of attachment to the wheel truck to the rail upon which the associated wheel is traveling.

Once the weight 44 and its flexible support means 46 have been released from the housing 40, the weight 44 is in position to impinge upon or impact with the next strike plate 64 encountered in the travel of the rolling stock supported by the wheel truck assembly 10. Upon impact between the weight 44 and the strike plate 64, a metal-to-metal impact is provided, and an electrical output signal is also provided by means of the vibration of electromechanical transducers 66 and 68, as more completely described in my aforementioned U.S. Pat. No. 3,546,448.

The addition of an optically reflecting substance, such as aluminum powder, to the temperature-sensitive material 52 in housing 40 provides yet another indication of an overheated bearing when the temperature of the bearing is such as to cause melting of the temperature-sensitive material 52 and the aforedescribed release of the weight 44 and its flexible support means 46, in that as the material 52 melts it also is expelled by gravity through the opening 42, and as the melted material 52 flows down the outer vertical face (face 36 in FIG. 1) of the journal box, the aluminum powder or other reflective substance coats this face of the box to provide an indication which may be readily seen in daylight or, alternatively, by reflection of a flashlight beam at night.

The invention has been described above in some detail, and particularly in connection with a preferred embodiment thereof which simultaneously provides accurate detection of an overheated bearing and an easily observable signal indicative of that fact and of the exact location of the fault. However, it will be obvious to those skilled in the art that various modifications may be made as to the details described. For example, the invention applies, as indicated, equally well to journal or friction bearings as shown in detail herein and to roller bearings. Further, the invention is applicable to bearings other than wheel bearings of railway rolling stock and, indeed, the present invention is of obvious utility in still other applications where an indication must be made of a temperature having exceeded a predetermined threshold value. In addition, any desired composition may be utilized as the temperature-sensitive material 52 referred to herein, the particular composition or ratio of components thereof being selected to effect the transistion from the solid state to the liquid state at a desired temperature. Similarly, the optically reflective ingredient, indicated at 70 in FIG. 4, may comprise any suitable substance other than aluminum powder, if desired. Hence, the invention is not to be considered as limited to the particular details given, nor to the specific application to which reference has been made during the description of the invention, but should be considered as extending to encompass all such revisions and modifications as would be obvious to a workman of ordinary skill in the art.

What is claimed is:

1. Apparatus for indicating overheated vehicle bearings, comprising
weight means,
elongate flexible support means interconnecting said weight means and a relatively fixed member of such vehicle, said elongate flexible support means having a first end connected to such relatively fixed member and a second end connected to said weight means,
means for storing said weight means adjacent said relatively fixed vehicle member, said storing means comprising a housing adapted to confine said weight means and said elongate flexible support means in compacted form, and
means responsive to a selected temperature of such vehicle bearing for releasing said weight means,
whereby said weight means and a substantial portion of said elongate flexible support means fall by gravity from the stored position within said housing to a depending position outside said housing, said weight means being supported in the latter position solely by said elongate flexible support means in its extended position to provide an indication of an overheated bearing.

2. Apparatus for indicating overheated vehicle bearings in accordance with claim 1, wherein said temperature responsive means is a substance which is in its solid state below said selected temperature and in its liquid state above said selected temperature.

3. Apparatus for indicating overheated vehicle bearings in accordance with claim 2, wherein said elongate flexible support means is stored in compacted form within said temperature responsive means.

4. Apparatus for indicating overheated vehicle bearings in accordance with claim 2, wherein the composition of the substance comprising said temperature responsive means includes an optically reflective ingredient.

5. Apparatus for indicating overheated vehicle bearings in accordance with claim 4, wherein said optically reflective composition ingredient constitutes aluminum powder.

6. Apparatus for indicating overheated vehicle bearings in accordance with claim 1, wherein the point on said relatively fixed vehicle member to which said elongate flexible support means is attached is at a height above the surface traversed by such vehicle substantially equal to the length of said elongate flexible support means.

7. Apparatus for indicating overheated vehicle bearings in accordance with claim 1, wherein said relatively fixed vehicle member comprises a wheel bearing housing.

8. Apparatus for indicating overheated vehicle bearings in accordance with claim 7, wherein said storing means comprises a housing adapted to confine said weight means and said elongate flexible support means in compacted form.

9. Apparatus for indicating overheated vehicle bearings in accordance with claim 7, wherein said temperature responsive means is a substance which is in its solid state below said selected temperature and in its liquid state above said selected temperature.

10. Apparatus for indicating overheated vehicle bearings in accordance with claim 9, wherein said elongate flexible support means is stored in compacted form within said temperature responsive means.

11. Apparatus for indicating overheated vehicle bearings in accordance with claim 9, wherein the composition of the substance comprising said temperature responsive means includes an optically reflective ingredient.

12. Apparatus for indicating overheated vehicle bearings in accordance with claim 11, wherein said optically reflective composition ingredient constitutes aluminum powder.

13. Apparatus for indicating overheated vehicle bearings in accordance with claim 7, wherein the point on said relatively fixed vehicle member to which said elongate flexible support means is attached is at a height above the surface traversed by such vehicle substantially equal to the length of said elongate flexible support means.

14. Apparatus for indicating overheated vehicle bearings in accordance with claim 7, wherein said relatively fixed vehicle member comprises that portion of the wheel bearing housing to which the major portion of the frictional heat of such bearing is transmitted.

15. Apparatus for indicating overheated vehicle bearings in accordance with claim 7, wherein said relatively fixed vehicle member comprises the top of the wheel bearing housing.

16. Apparatus for indicating overheated vehicle bearings in accordance with claim 1, wherein the point on said relatively fixed vehicle member to which said elongate flexible support means is attached is at a height above the surface traversed by such vehicle substantially equal to the length of said elongate flexible support means, and
   including electromechanical transducer means mounted adjacent a path traversed by such vehicle for providing an electrical output signal indicative of an overheated bearing upon being struck by said weight means depending from the end of said elongate flexible support means in its extended condition.

17. Apparatus for indicating overheated vehicle bearings in accordance with claim 1, wherein the point on said relatively fixed vehicle member to which said elongate flexible support means is attached is at a height above the surface traversed by such vehicle substantially equal to the length of said elongate flexible support means, and
   including a metallic strike plate mounted adjacent a path traversed by such vehicle for providing an audible signal indicative of an overheated bearing upon being struck by said weight means depending from the end of said elongate flexible support means in its extended condition.

18. Apparatus for indicating overheated vehicle bearings in accordance with claim 1, wherein the point on said relatively fixed vehicle member to which said elongate flexible support means is attached is at a height above the surface traversed by such vehicle substantially equal to the length of said elongate flexible support means, and
   including a metallic strike plate mounted adjacent a path traversed by such vehicle and electrical transducer means mounted on said strike plate for providing both impact and electrical output signals indicative of an overheated bearing upon being struck by said weight means depending from the end of said elongate flexible support means in its extended condition.

19. Apparatus for indicating overheated vehicle bearings in accordance with claim 1, wherein the point on said relatively fixed vehicle member to which said elongate flexible support means is attached is at a height above the surface traversed by such vehicle substantially equal to the length of said elongate flexible support means, said weight means comprising a metallic member.

20. Apparatus for indicating overheated vehicle bearings in accordance with claim 19, and including electromechanical transducer means mounted adjacent a path traversed by such vehicle for providing an electrical output signal indicative of an overheated bearing upon being struck by said weight means depending from the end of said elongate flexible support means in its extended condition.

21. Apparatus for indicating overheated vehicle bearings in accordance with claim 19, and including a metallic strike plate mounted adjacent a path traversed by such vehicle for providing an audible signal indicative of an overheated bearing upon being struck by said weight means depending from the end of said elongate flexible support means in its extended condition.

22. Apparatus for indicating overheated vehicle bearings in accordance with claim 19, and including a metallic strike plate mounted adjacent a path traversed by such vehicle and electromechanical transducer means mounted on said strike plate for providing both impact and electrical output signals upon being struck by said weight means depending from the end of said elongate flexible support means in its extended condition.

* * * * *